(12) United States Patent
Wang et al.

(10) Patent No.: US 12,505,121 B2
(45) Date of Patent: Dec. 23, 2025

(54) INFORMATION PUSHING METHOD AND SERVER SIDE

(71) Applicant: Huawei Technologies Co., Ltd., Shenzhen (CN)

(72) Inventors: Jian Wang, Shenzhen (CN); Jiujiu Wu, Shenzhen (CN); Hongfei Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/781,414

(22) Filed: Jul. 23, 2024

(65) Prior Publication Data
US 2024/0378217 A1  Nov. 14, 2024

Related U.S. Application Data

(63) Continuation of application No. PCT/CN2022/131121, filed on Nov. 10, 2022.

(30) Foreign Application Priority Data

Jan. 24, 2022  (CN) .......................... 202210084156.7

(51) Int. Cl.
*G06F 16/27* (2019.01)
*G06F 16/23* (2019.01)

(52) U.S. Cl.
CPC .......... *G06F 16/27* (2019.01); *G06F 16/2365* (2019.01)

(58) Field of Classification Search
CPC ...... G06F 16/27; G06F 16/273; G06F 16/275; G06F 16/278; G06F 16/2365
USPC ........................................................ 707/634
See application file for complete search history.

(56) References Cited

U.S. PATENT DOCUMENTS

| 2015/0334182 A1* | 11/2015 | Wu ......................... H04L 67/02 707/620 |
| 2018/0150501 A1* | 5/2018 | Hattori ................ G06F 16/2358 |

FOREIGN PATENT DOCUMENTS

| CN | 102982126 A | 3/2013 |
| CN | 104408132 A | 3/2015 |
| CN | 106209948 A | 12/2016 |
| CN | 107528894 A | 12/2017 |
| CN | 111597257 A | 8/2020 |
| CN | 112559473 A | 3/2021 |

OTHER PUBLICATIONS

EP4443311 European Search Opinion Jan. 29, 2025 (Year: 2025).*

* cited by examiner

*Primary Examiner* — Michael Pham
(74) *Attorney, Agent, or Firm* — Conley Rose, P.C.

(57) ABSTRACT

An information pushing method includes a server side that stores, in a target cache space after a cloud database successfully performs an operation, a type of the operation and an identifier of data associated with the operation. Then, when pushing to a client, the server side pushes related information of the data to the client based on the identifier of the data, the type of the operation, and whether the data exists in the cloud database currently, where the related information of the data is used by the client to determine a change between the data in the cloud database currently and that before the operation is performed such that an impact on performance of the cloud database can be reduced, and the client can obtain data information consistent with that in the cloud database.

20 Claims, 4 Drawing Sheets

Method 200

After a cloud database successfully performs an operation, store, in a target cache space, a type of the operation and an identifier of data associated with the operation — Step 201

When pushing to a client, push related information of the data to the client based on the identifier of the data, the type of the operation, and whether the data exists in the cloud database currently, where the related information of the data is used by the client to determine a change between the data in the cloud database currently and that before the operation is performed — Step 202

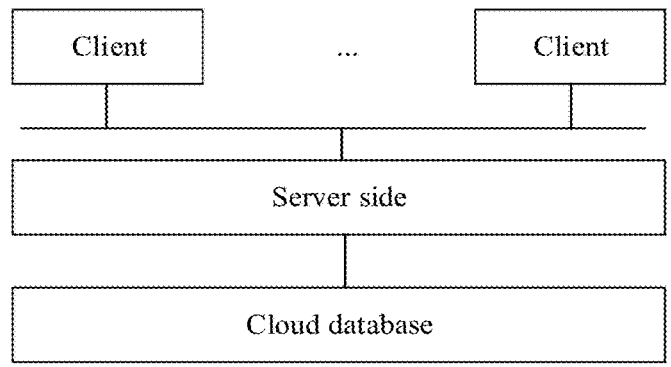

FIG. 1

Method 200

After a cloud database successfully performs an operation, store, in a target cache space, a type of the operation and an identifier of data associated with the operation — Step 201

When pushing to a client, push related information of the data to the client based on the identifier of the data, the type of the operation, and whether the data exists in the cloud database currently, where the related information of the data is used by the client to determine a change between the data in the cloud database currently and that before the operation is performed — Step 202

FIG. 2

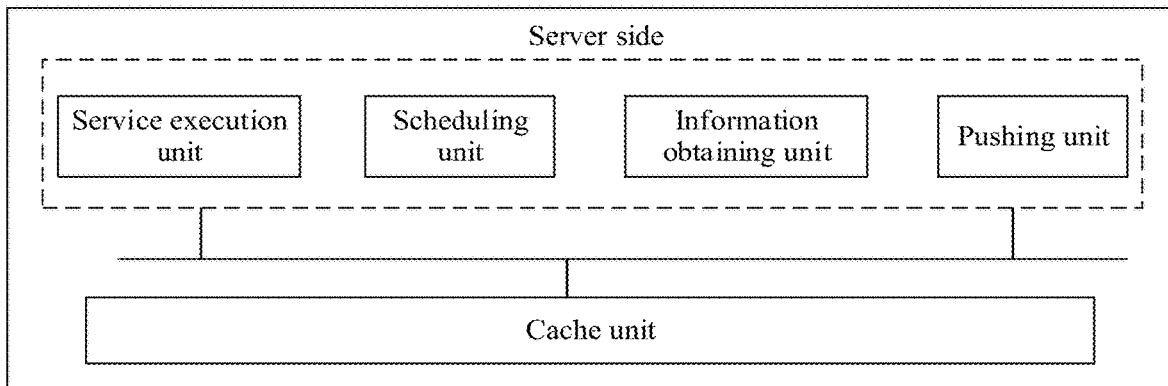

FIG. 3

INFORMATION PUSHING METHOD AND SERVER SIDE

CROSS-REFERENCE TO RELATED APPLICATIONS

This is a continuation of International Patent Application No. PCT/CN2022/131121 filed on Nov. 10, 2022, which claims priority to Chinese Patent Application No. 202210084156.7 filed on Jan. 24, 2022. The disclosures of the aforementioned applications are hereby incorporated by reference in their entireties.

TECHNICAL FIELD

This disclosure relates to the field of cloud storage, and in particular, to an information pushing method and a server side.

BACKGROUND

A cloud database may provide a cloud storage capability for a client. In a concurrency scenario, a plurality of clients is allowed to simultaneously request to operate data in the cloud database. After a plurality of requests are successfully processed by the cloud database, the data in the cloud database usually changes. In this case, changes of the data in the cloud database need to be pushed to each client, to enable each client to obtain data information consistent with that in the cloud database.

To ensure that the client can obtain the data information consistent with that in the cloud database, the cloud database usually needs to sequentially push, after the requests are executed, the changes of the data in the cloud database to each client based on an execution sequence of the plurality of requests, so that the client obtains the data information consistent with that in the cloud data. However, this greatly affects performance of the cloud database.

SUMMARY

This disclosure provides an information pushing method and a server side such that when a change of data in a cloud database is pushed to a client, impact on performance of the cloud database can be reduced, and the client can obtain data information consistent with that in the cloud database.

According to a first aspect, an information pushing method is provided, including, after a cloud database successfully performs an operation, storing, in a target cache space, a type of the operation and an identifier of data associated with the operation, and then when a server side pushes to a client, pushing related information of the data to the client based on the identifier of the data, the type of the operation, and whether the data exists in the cloud database currently, where the related information of the data is used by the client to determine a change between the data in the cloud database currently and that before the operation is performed.

Based on the foregoing technical solution, after the cloud database successfully performs the operation, the server side stores, in the target cache space, the type of the operation and the identifier of the data associated with the operation. Therefore, the server side can determine, from the target cache space, the data that is in the cloud database and that changes due to performing of the operation and the change of the data. Then, when pushing to the client, the server side reviews the change by using the current cloud database, that is, determines whether a change consistent with the change exists in the cloud database currently, and if the change consistent with the change exists in the cloud database currently, pushes, to the client, the related information of the data associated with the operation, so that the client determines, based on the related information of the data pushed by the server side, the change between the data in the cloud database currently and that before the operation is performed. Then, the change is synchronized locally, to obtain data information consistent with that in the cloud database.

It should be noted that storing, in a target cache space, a type of the operation and an identifier of data is merely an implementation, and does not constitute a limitation on embodiments of this disclosure. During a specific implementation, the type of the operation and the data corresponding to the identifier may also be stored in the target cache space. Because the identifier occupies less memory than the data corresponding to the identifier, the implementation in which the identifier and the type of the operation are stored in the target cache space can reduce memory occupation compared with an implementation in which the type of the operation and the data corresponding to the identifier are stored in the target cache space.

With reference to the first aspect, in some implementations of the first aspect, pushing related information of the data to the client based on the identifier of the data, the type of the operation, and whether the data exists in the cloud database currently includes, if the type of the operation in the target cache space indicates that the data corresponding to the identifier is generated by performing an update/insert operation, and the data exists in the cloud database currently, pushing the related information of the data to the client, where the related information of the data includes the data, or when pushing to the client, if the type of the operation in the target cache space indicates that a deletion operation is performed on the data corresponding to the identifier, and the data does not exist in the cloud database currently, push the related information of the data to the client, where the related information of the data includes the identifier corresponding to the data.

Based on the foregoing technical solution, after the cloud database successfully performs the deletion operation or the update/insert operation, the server side stores, in the target cache space, the type of the deletion operation and the identifier corresponding to the data on which the deletion operation is performed, or the type of the update/insert operation and the identifier corresponding to the data generated by performing the update/insert operation. Therefore, the server side may determine, from the target cache space, the data that is deleted from the cloud database, the data that is recorded in the cloud database. Then, when the server side pushes to the client, if the data corresponding to the identifier is generated by performing the update/insert operation, the server side may review, by using the current cloud database, the data generated by performing the update/insert operation, that is, determine whether the data generated by performing the update/insert operation exists in the cloud database currently. If the data generated by performing the update/insert operation exists in the cloud database currently, the server side obtains, from the cloud database, the data generated by performing the update/insert operation, and pushes the data to the client, so that the client synchronizes the data locally based on pushing of the server side, to obtain data information consistent with that in the cloud database. Alternatively, when the server side pushes the data to the client, if the deletion operation is performed on the data corresponding to the identifier, the server side may review, by using the current cloud database, the data on which the deletion operation is performed, that is, determine whether the data on which the deletion operation is performed does not exist in the cloud database currently. If the data on which the deletion operation is performed does not exist in the cloud database currently, the server side pushes the identifier corresponding to the data to the client, so that the client determines, based on pushing of the server side, that the data is deleted from the cloud database, and further deletes the data locally, to obtain data information consistent with that in the cloud database.

In addition, in this solution, because the server side only needs to use the cloud database to review the data generated by performing the update/insert operation or the data on which the deletion operation is performed, performance of the cloud database is not greatly affected.

With reference to the first aspect, in some implementations of the first aspect, if the server side obtains the identifier and the type of the operation from the target cache space, the method further includes the following. The server side clears the obtained identifier and the obtained type of the operation from the target cache space.

Based on the foregoing technical solution, after the server side obtains the identifier and the type of the operation from the target cache space, to enable the server side to subsequently obtain, from the target cache space, an identifier and a type of an operation that are stored in the target cache space after the identifier and the type of the operation, after obtaining the identifier and the type of the operation from the target cache space, the server side may clear, from the target cache space, the identifier and the type of the operation that are obtained this time.

It should be noted that the foregoing is merely used as an example for description, and does not constitute a limitation on embodiments of this disclosure. During a specific implementation, the server side may store the identifier and the type of the operation in the target cache space in an overwriting storage manner.

With reference to the first aspect and the implementations, in some implementations of the first aspect, if the type of the operation in the target cache space indicates that the data corresponding to the identifier is generated by performing the update/insert operation, and the data exists in the cloud database currently, the related information of the data further includes a type of the update/insert operation.

Based on the foregoing technical solution, the server side pushes, to the client, the data generated by performing the update/insert operation, and also pushes the type of the update/insert operation, so that the client can present, to a user based on related information of the data, the data generated by performing the update/insert operation. Further, the client may present, to the user, that the data is generated by performing the update/insert operation. This improves user experience.

With reference to the first aspect and the implementations, in some implementations of the first aspect, if the type of the operation in the target cache space indicates that the deletion operation is performed on the data corresponding to the identifier, and the data does not exist in the cloud database currently, the related information of the data further includes a type of the deletion operation.

With reference to the first aspect and the implementations, in some implementations of the first aspect, the target cache space includes a first cache space and a second cache space, the first cache space is used to store the type of the update/insert operation and the identifier corresponding to the data generated by performing the update/insert operation, and the second cache space is used to store the type of the deletion operation and the identifier corresponding to the data on which the deletion operation is performed.

With reference to the first aspect and the implementations, in some implementations of the first aspect, before the storing, in a target cache space, a type of the operation and an identifier of data associated with the operation, the method further includes determining whether the type of the operation and the identifier of the data associated with the operation already exist in the target cache space, and if the type of the operation and the identifier of the data associated with the operation already exist in the target cache space, the storing, in a target cache space, a type of the operation and an identifier of data associated with the operation includes storing, in the target cache space in a deduplication manner, the type of the operation and the identifier of the data associated with the operation.

Based on the foregoing technical solution, when storing the identifier and the type of the operation to the target cache space, the server side stores the identifier and the type of the operation in the deduplication manner, to combine repeated operation types and identifiers. In this way, for a case in which a plurality of update/insert operations are performed in the cloud database in short time, and identifiers of a plurality of pieces of data generated by performing the plurality of update/insert operations are the same, the repeated identifiers and types of the operation are combined, so that the server side may not need to push, to the client, data generated by performing each update/insert operation, but may push, based on a last pair of a type of an update/insert operation and an identifier corresponding to data generated by performing the update/insert operation that are stored in the target cache space in this time period, only the data generated by performing the last update/insert operation in the time period is pushed to the client. This reduces a redundant push and reduces push traffic consumption.

With reference to the first aspect and the implementations, in some implementations of the first aspect, the method further includes obtaining a subscription condition, where the subscription condition indicates data concerned by a client associated with the subscription condition, and the storing, in a target cache space, a type of the operation and an identifier of data associated with the operation includes, after it is determined that the data meets the subscription condition, storing the identifier of the data and the type of the operation in the target cache space.

Based on the foregoing technical solution, the type of the operation and the identifier of the data that meets the subscription condition are stored in the target cache space, so that the server side can push a change of the subscribed data in the cloud database to the client. This improves user experience.

With reference to the first aspect and the foregoing implementations, in some implementations of the first aspect, before the pushing related information of the data to the client, the method further includes determining that the subscription condition is associated with the client.

Based on the foregoing technical solution, the information related to data is pushed to the client associated with the subscription condition, so that the client associated with the subscription condition can obtain a change of data that is in the cloud database and that is interested in by the client. This improves user experience.

According to a second aspect, this disclosure provides an apparatus. The apparatus is included in a server side, and the apparatus has a function of implementing behavior of the server side in the foregoing aspect and the possible implementations of the foregoing aspect. The function may be implemented by hardware, or may be implemented by executing corresponding software by hardware. The hardware or the software includes one or more modules or units corresponding to the function, for example, a processing module or unit, or a pushing module or unit.

According to a third aspect, this disclosure provides a server side, including a processor, a memory, and one or more computer programs. The one or more computer programs are stored in the memory, and the one or more computer programs include instructions. When the instructions are executed by the server side, the server side is enabled to perform the information pushing method according to any possible implementation of any one of the foregoing aspects.

According to a fourth aspect, this disclosure provides a computer-readable storage medium, including computer instructions. When the computer instructions are run on a server side, the server side is enabled to perform the information pushing method according to any possible implementation of any one of the foregoing aspects.

According to a fifth aspect, this disclosure provides a computer program product. When the computer program product runs on a server side, the server side is enabled to perform the information pushing method according to any possible implementation of any one of the foregoing aspects.

BRIEF DESCRIPTION OF DRAWINGS

FIG. 1 is a diagram of a system architecture according to an embodiment of this disclosure;

FIG. 2 is a flowchart of an example of an information pushing method according to an embodiment of this disclosure;

FIG. 3 is a block diagram of an example of a server side according to an embodiment of this disclosure;

DESCRIPTION OF EMBODIMENTS

Figure 4:
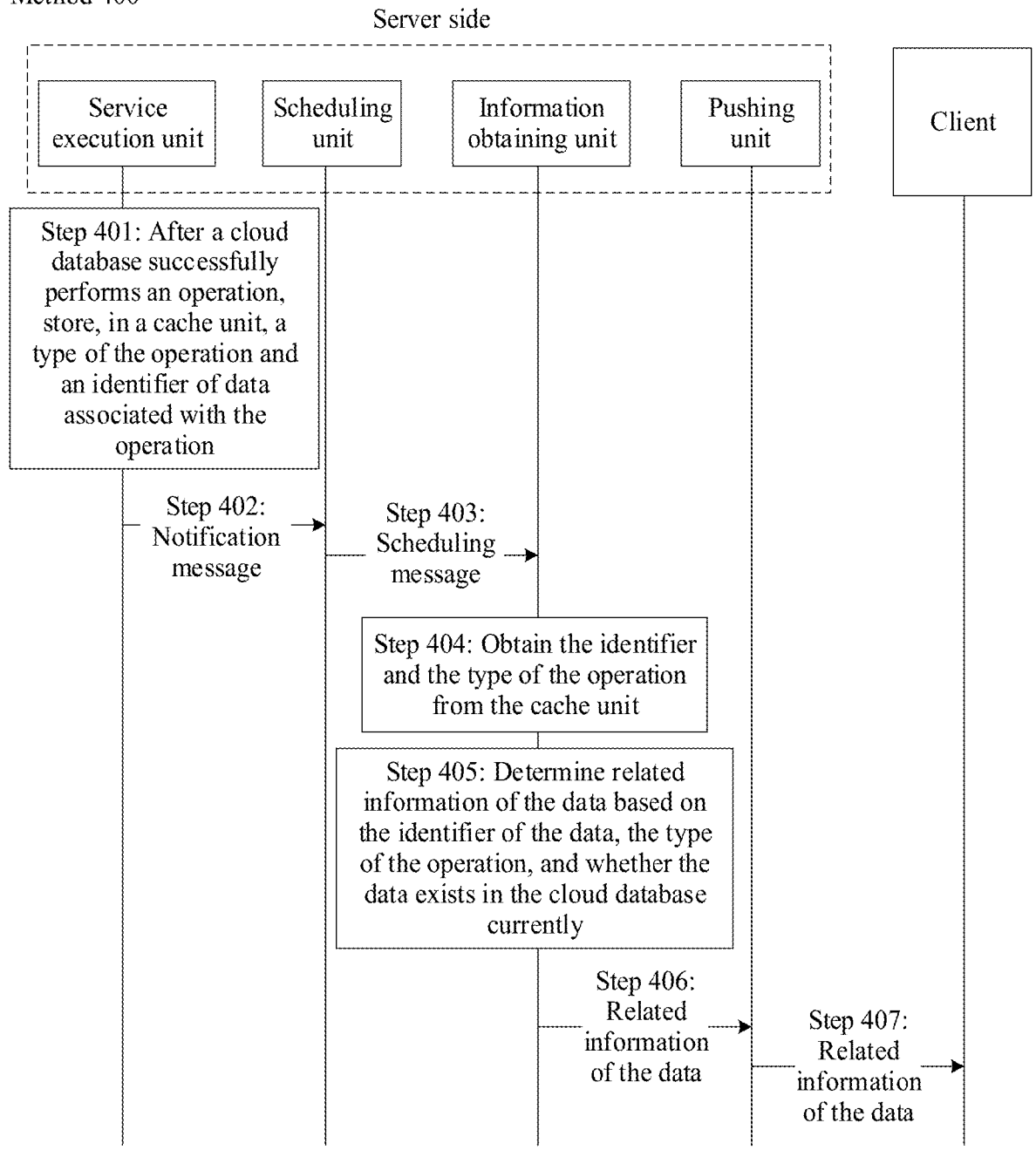
FIG. 4 is a flowchart of another example of an information pushing method according to an embodiment of this disclosure.

The following describes technical solutions of this disclosure with reference to the accompanying drawings.

FIG. 1 is a diagram of a system architecture according to an embodiment of this disclosure. A cloud database stores data of N (N≥2) clients, and the clients may request to operate the data in the cloud database. After an operation is completed, if the data in the cloud database changes, a change of the data in the cloud database needs to be pushed to each client, to enable each client to obtain data information consistent with that in the cloud database.

For example, the cloud database stores names, genders, and ages of students in a class, where a name, a gender, and an age of each student are one piece of data. It is assumed that a user A changes an age of a student in the class from 12 to 13 on a client of the user A. In this case, to ensure that data of the class stored in a client that stores the data of the class is consistent with that in the cloud database, data of the student whose age is changed needs to be pushed to each client, so that the data of the class stored in each client is consistent with that in the cloud database.

With reference to FIG. 2 to FIG. 5, the following describes an information pushing method provided in embodiments of this disclosure.

FIG. 2 is a schematic flowchart of an example of an information pushing method 200 according to an embodiment of this disclosure. The method 200 includes at least the following steps.

Step 201: After a cloud database successfully performs an operation, a server side stores, in a target cache space, a type of the operation and an identifier of data associated with the operation.

Optionally, in an implementation, when receiving a data operation request from a client, the server side may forward the received request to the cloud database, and the cloud database performs, based on the received request, an operation associated with the request, namely, the operation in step 201. After the operation is successfully performed, the cloud database may push an execution result of the request to the server side. If the execution result indicates that the cloud database has successfully performed the operation, the server side may store, in the target cache space, the type of the operation and the identifier of the data associated with the operation.

It should be noted that "the data associated with the operation" may be understood as the following. If the operation is an update/insert operation, "the data associated with the operation" may be data generated by performing the update/insert operation, or if the operation is a deletion operation, "the data associated with the operation" may be data on which the deletion operation is performed.

For example, the data operation request from the client is used to request the server side to delete the data, the server side forwards the request to the cloud database, and the cloud database performs the operation, namely, the deletion operation. Then, after the server side determines that the cloud database successfully processes the data operation request, the server side may store, in a target cache space, a type of the deletion operation and an identifier corresponding to the data on which the deletion operation is performed.

For example, the cloud database stores names, quantities of current month attendance days, and current month salaries of employees of a company. A name, a quantity of current month attendance days, and a current month salary of each employee are one piece of data, the name of each employee may be used as an identifier of data corresponding to the employee, and the identifier can be used to uniquely determine, in the plurality of pieces of data in the cloud database, the data corresponding to the employee.

It is assumed that the data operation request from the client is used to request the cloud database to record at least one piece of data, and the server side forwards the request to the cloud database. It is assumed that when the cloud database processes the request, a piece of data (Zhang San, 20, 4500) already exists in the cloud database. The following describes different cases in which the cloud database processes the request.

Case 1:

If the data operation request from the client is used to request the cloud database to record data (Zhang San, 20, 5000), the cloud database updates the data (Zhang San, 20, 4500) to the data (Zhang San, 20, 5000) based on the request.

Case 2:

If the data operation request from the client is used to request the cloud database to record data (Li Si, 20, 4000), the cloud database inserts the data (Li Si, 20, 4000) based on the request.

It should be noted that, in embodiments of this disclosure, each of operations performed when the cloud database processes the data operation requests from the client in case 1 and case 2 may be referred to as an upsert operation. In other words, based on an actual situation, the upsert operation may be equivalent to an update operation (for example, an operation in case 1), or the upsert operation may be equivalent to an insert operation (for example, an operation in case 2).

For case 1, after the cloud database successfully processes the data operation request, the server side may store, in the target cache space, a type of the upsert operation and an identifier "Zhang San" corresponding to the data (Zhang San, 20, 5000).

It should be noted that, for case 1, when updating the data (Zhang San, 20, 4500) to the data (Zhang San, 20, 5000), the cloud database may first delete the data (Zhang San, 20, 4500), and then insert the data (Zhang San, 20, 5000) into the cloud database. In this case, the server side may store, in the target cache space, the type of the upsert operation, the identifier "Zhang San" corresponding to the data (Zhang San, 20, 5000), the type of the deletion operation, and an identifier "Zhang San" corresponding to the data (Zhang San, 20, 4500).

For case 2, after the cloud database successfully processes the data operation request, the server side may store, in the target cache space, a type of the upsert operation and an identifier "Li Si" corresponding to the data (Li Si, 20, 4000).

It is assumed that the server side receives the data operation request from the client, and the server side forwards the request to the cloud database. It is assumed that when the cloud database processes the request, the data (Zhang San, 20, 4500) and the data (Li Si, 20, 4000) already exist in the cloud database.

If the data operation request is used to request the cloud database to delete the data (Li Si, 20, 4000), the cloud database deletes the data (Li Si, 20, 4000) based on the data operation request.

After the cloud database successfully processes the data operation request, the server side may store, in the target cache space, the type of the deletion operation and the identifier "Li Si" corresponding to the data (Li Si, 20, 4000).

It should be noted that the identifier is described by using only an example in which the name is used as the identifier of the data. However, this does not constitute a limitation on embodiments of this disclosure. The identifier in embodiments of this disclosure may be any information in a piece of data that can be used to uniquely determine the piece of data in a plurality of pieces of data.

For example, an identifier of a piece of data may be a primary key of the piece of data.

Optionally, in an implementation, before storing an identifier and a type of an operation in the target cache space, the server side may determine whether a pair of an identifier and a type of an operation that is the same as the identifier and the type of the operation already exists in the target cache space. If the identifier and the type of the operation already exist in the target cache space, the server side may store the identifier and the type of the operation in the target cache space in a deduplication manner. "A non-repeatable manner" may be understood as follows. The target storage space is not allowed to have two same pairs of identifiers and types of operations.

For example, if the server side finds, before storing the identifier and the type of the operation in the target cache space, that the same pair of the identifier and the type of the operation already exists in the target cache space, before or after storing the identifier and the type of the operation in the target cache space, the server side may delete the pair of the identifier and the type of the operation that already exists in the target cache space.

Optionally, in an implementation, when storing, in the target cache space, the identifier and the type of the operation associated with the identifier, the server side may store, based on the type of the operation, the identifier and the type of the operation in a cache space that is in the target cache space and that corresponds to the type of the operation.

For example, if the type of the operation is the type of the upsert operation, the server side may store, in a first cache space of the target cache space, the type of the upsert operation and the identifier corresponding to the data generated by performing the upsert operation, or if the type of the operation is the type of the deletion operation, the server side may store, in a second cache space of the target cache space, the type of the deletion operation and the identifier corresponding to the data on which the deletion operation is performed.

Optionally, in an implementation, before storing, in the target cache space, the identifier corresponding to the data and the type of the operation associated with the identifier, the server side may obtain a subscription condition, where the subscription condition indicates data concerned by a client associated with the subscription condition. In this case, after the cloud database successfully performs the operation, the server side may further determine whether the data corresponding to the identifier meets the subscription condition.

For example, if the data corresponding to the identifier is data concerned by a user, it may be considered that the data meets the subscription condition. On the contrary, if the data corresponding to the identifier is not the data concerned by the user, it may be considered that the data does not meet the subscription condition.

For example, if the type of the operation is the type of the upsert operation, after determining that the data generated by performing the upsert operation meets the subscription condition of the client, the server side may store, in the target cache space, the type of the upsert operation and the identifier corresponding to the data generated by performing the upsert operation, or if the type of the operation is the type of the deletion operation, after determining that the data on which the deletion operation is performed meets the subscription condition of the client, the server side may store, in the target cache space, the type of the deletion operation and the identifier corresponding to the data, where the subscription condition may be synchronized by the client to the server side in advance.

For example, if the type of the operation is the type of the upsert operation, the server side may obtain the subscription condition, and match the obtained subscription condition with the data generated by performing the upsert operation. If the data generated by performing the upsert operation successfully matches the subscription condition, it may be considered that the data meets the subscription condition. In this case, the server side may store, in the target cache space, the type of the upsert operation and the identifier corresponding to the data generated by performing the upsert operation. Alternatively, if the type of the operation is the type of the deletion operation, the server side may obtain the subscription condition, and match the obtained subscription condition with the data on which the deletion operation is performed. If the data on which the deletion operation is performed successfully matches the subscription condition, it may be considered that the data meets the subscription condition. In this case, the server side may store, in the target cache space, the type of the deletion operation and the identifier corresponding to the data on which the deletion operation is performed.

It is assumed that the cloud database stores names, classes, and ages of students of a grade, and the subscription condition is data of students in class three of the grade. If the data operation request from the client is used to request to delete data of some students in class three of the grade from the cloud database, and the deleted data of the students can successfully match the subscription condition, the server side may store, in the target cache space, the type of the deletion operation and identifiers corresponding to the data of the students. Alternatively, if the data operation request from the client is used to request to insert data of some students in class three into the cloud database, and the inserted data of the students can successfully match the subscription condition, the server side may store, in the target cache space, the type of the upsert operation and identifiers corresponding to the data of the students. Alternatively, if the data operation request from the client is used to request to update classes of some students of the grade in the cloud database from original classes to class three, and data of the students whose classes are updated can successfully match the subscription condition, the server side may store, in the target cache space, the type of the upsert operation and identifiers corresponding to the updated data of the students. Alternatively, if the data operation request from the client is used to request to change classes of some students in class three of the grade in the cloud database to class two, and data of the students before class modification can successfully match the subscription condition, the server side may store, in the target cache space, the type of the deletion operation and identifiers corresponding to the data of the students before class modification.

Optionally, in an implementation, when storing, in the target cache space, the identifier and the type of the operation associated with the identifier, the server side may store, in the first cache space of the target cache space, the type of the upsert operations and the identifiers corresponding to the data that meets the same subscription condition and that is generated by performing the upsert operations, and store, in the second cache space of the target cache space, the type of the deletion operation and the identifier corresponding to the data on which the deletion operation is performed and that meets the subscription condition.

Still as shown in an example in which the cloud database stores names, classes, and ages of students of a grade, and the subscription condition is data of a student in class three of the grade.

If the data operation request from the client is used to request to delete data of a student Zhang in class three of the grade from the cloud database, and the deleted data of the student Zhang meets the subscription condition, based on the foregoing descriptions, the server side may store, in the second cache space of the target cache space, the type of the deletion operation and an identifier corresponding to the data of the student Zhang.

If the data operation request from the client is used to request to change a class of a student Wang in class 5 of the grade to class 3, and data of the student Wang after class modification meets the subscription condition, based on the foregoing descriptions, the server side may store, in the first cache space of the target cache space, the type of the upsert operation and an identifier corresponding to the data of the student Wang.

If the data operation request from the client is used to request to record data of a student Zhao in the cloud database, that is, a class of the student Zhao is class 3, data of Zhao, based on the foregoing descriptions, the server side may store, in the first cache space of the target cache space, the type of the upsert operation and an identifier corresponding to the data of the student Zhao.

Step 202: When pushing to the client, the server side pushes related information of the data to the client based on the identifier of the data, the type of the operation, and whether the data exists in the cloud database currently, where the related information of the data is used by the client to determine a change between the data in the cloud database currently and that before the operation is performed.

Optionally, in an implementation, if the type of the operation in the target cache space indicates that the data corresponding to the identifier is generated by performing the upsert operation, and the data exists in the cloud database currently, the related information of the data is pushed to the client, where the related information of the data includes the data.

For example, after storing the identifier and the type of the operation in the target cache space, the server side may obtain the identifier and the type of the operation from the target cache space when pushing to the client. If the type of the operation obtained by the server side from the target cache space indicates that the data corresponding to the identifier is generated by performing the upsert operation, and the data corresponding to the identifier exists in the cloud database currently, the server side may obtain the data from the cloud database, and the data is the data generated by performing the upsert operation. Then, the server side may push, to the client, the data generated by performing the upsert operation, namely, the related information of the data.

After receiving the related information of the data, the client may present, to the user based on the related information of the data, the data generated by performing the upsert operation.

Optionally, in an implementation, if the type of the operation in the target cache space indicates that the data corresponding to the identifier is generated by performing the upsert operation, and the data exists in the cloud database currently, the related information of the data further includes the type of the upsert operation.

For example, after storing the identifier and the type of the operation in the target cache space, the server side may obtain the identifier and the type of the operation from the target cache space when pushing to the client. If the type of the operation obtained by the server side from the target cache space indicates that the data corresponding to the identifier is generated by performing the upsert operation, and the data exists in the cloud database currently, the server side may obtain the data from the cloud database, and the data is the data generated by performing the upsert operation. Then, the server side may push, to the client, the type of the upsert operation and the data generated by performing the upsert operation, namely, the related information of the data.

After receiving the related information of the data, the client may present, to the user based on the related information of the data, the data generated by performing the upsert operation. Further, the client may present, to the user, that the data is generated by performing the upsert operation.

Optionally, in an implementation, if the type of the operation in the target cache space indicates that the data corresponding to the identifier is generated by performing the upsert operation, and the data does not exist in the cloud database currently, the server side does not push any data to the client this time.

For example, after storing the identifier and the type of the operation in the target cache space, the server side may obtain the identifier and the type of the operation from the target cache space when pushing to the client. If the type of the operation obtained by the server side from the target cache space indicates that the data corresponding to the identifier is generated by performing the upsert operation, and the data corresponding to the identifier does not exist in the cloud database currently, a possible reason why the data corresponding to the identifier does not exist in the cloud database currently is as follows. After the upsert operation is performed on the data, the deletion operation is performed on the data at a request of the client or another client, but the identifier of the data and the type of the deletion operation have not yet been stored by the server side in the target cache space. Therefore, in this case, the server side may not push any data to the client this time, but wait for a next time.

Optionally, in an implementation, if the type of the operation in the target cache space indicates that the deletion operation is performed on the data corresponding to the identifier, and the data does not exist in the cloud database currently, the related information of the data is pushed to the client, where the related information of the data includes the identifier corresponding to the data.

For example, after storing the identifier and the type of the operation in the target cache space, the server side may obtain the identifier and the type of the operation from the target cache space when pushing to the client. If the type of the operation obtained by the server side from the target cache space indicates that the deletion operation is performed on the data corresponding to the identifier, and the data corresponding to the identifier does not exist in the cloud database currently, the server side may push, to the client, the identifier corresponding to the data on which the deletion operation is performed, namely, the related information of the data.

The client can come to an agreement with the server side. If only the identifier is pushed to the client, it indicates that the data corresponding to the identifier is deleted. Based on this, the client may determine, based on the pushed identifier, that the data corresponding to the identifier is deleted. Further, the client may inform the user that the data is deleted.

Optionally, in an implementation, if the type of the operation in the target cache space indicates that the deletion operation is performed on the data corresponding to the identifier, and the data does not exist in the cloud database currently, the related information of the data further includes the type of the deletion operation.

For example, after storing the identifier and the type of the operation in the target cache space, the server side may obtain the identifier and the type of the operation from the target cache space when pushing to the client. If the type of the operation obtained by the server side from the target cache space indicates that the deletion operation is performed on the data corresponding to the identifier, and the data corresponding to the identifier does not exist in the cloud database currently, the server side may push, to the client, the type of the deletion operation and the identifier corresponding to the data on which the deletion operation is performed, namely, the related information of the data.

After receiving the information related to the data, the client may determine, based on the identifier and the type of the operation, that the data corresponding to the identifier is deleted. Further, the client may inform the user that the data is deleted.

Optionally, in an implementation, if the type of the operation in the target cache space indicates that the deletion operation is performed on the data corresponding to the identifier, and the data exists in the cloud database currently, the server side does not push any data to the client this time.

After storing the identifier and the type of the operation in the target cache space, the server side may obtain the identifier and the type of the operation from the target cache space when pushing to the client. If the type of the operation obtained by the server side from the target cache space indicates that the deletion operation is performed on the data corresponding to the identifier, and the data corresponding to the identifier exists in the cloud database currently, a possible reason why the data corresponding to the identifier exists in the cloud database currently is as follows. After the deletion operation is performed on the data, the upsert operation is performed on the data at a request of the client or another client, but the identifier of the data and the type of the upsert operation have not yet been stored by the server side in the target cache space. Therefore, in this case, the server side may not push any data to the client this time, but wait for a next time.

Optionally, in an implementation, when obtaining the identifier and the type of the operation from the target cache space, the server side may clear the identifier and the type of the operation from the target cache space.

Optionally, in an implementation, before pushing the related information of the data to the client, the server side may determine that the subscription condition is associated with the client. If the server side determines that the subscription condition is associated with the client, the server side pushes the related information of the data to the client.

For example, before pushing the related information of the data to the client, the server side may find the client that synchronizes the subscription condition to the server side in advance. If the client synchronizes the subscription condition to the server side in advance, the server side pushes the related information of the data to the client.

The following uses a server side shown in FIG. 3 as an example to describe another pushing method 400 according to an embodiment of this disclosure. FIG. 4 is a schematic flowchart of the method 400. The method 400 includes at least the following steps.

Step 401: After a cloud database successfully performs an operation, a service execution unit stores, in a cache unit, a type of the operation and an identifier of data associated with the operation.

For example, the cloud database stores names, ages, and genders of students in a class, and the service execution unit receives four data operation requests from a client, where three data operation requests are respectively used to request the cloud database to record (Xiao Ming, 12, male), (Xiao Ming, 14, male), and (Xiao Zhang, 9, male), and one data operation request is used to request the cloud database to delete data related to "Xiao Ming". The service execution unit forwards the four data operation requests to the cloud database.

It is assumed that before the four data operation requests arrive at the cloud database, a piece of data (Xiao Ming, 10, male) already exists in the cloud database. Because the service execution unit forwards the requests to the cloud database in an asynchronous processing manner, after the cloud database processes the four requests, data recorded in the cloud database may be in the following three cases.

Case 1:

After the cloud database processes the four requests, the data recorded in the cloud database includes (Xiao Ming, 12, male) and (Xiao Zhang, 9, male).

Case 2:

After the cloud database processes the four requests, the data recorded in the cloud database includes (Xiao Ming, 14, male) and (Xiao Zhang, 9, male).

Case 3:

After the cloud database processes the four requests, the data recorded in the cloud database includes (Xiao Zhang, 9, male).

For case 1 to case 3, after the cloud database successfully performs each operation, the service execution unit may store, in the cache unit, a type of the operation and an identifier of data associated with the operation.

Optionally, in an implementation, the service execution unit may store, in a deduplication manner, a type of each operation and an identifier of data associated with the operation.

For example, it can be learned from the requests from the client that when recording the data (Xiao Ming, 12, male) and (Xiao Ming, 14, male) in the cloud database, the cloud database may perform an upsert operation twice, identifiers of the data associated with the two upsert operations are both "Xiao Ming". In this case, the service execution unit may store only a pair of the identifier (Xiao Ming) and the type of the operation (a type of the upsert operation).

Optionally, in an implementation, the service execution unit may store, in a cache space in the cache unit, the type of the upsert operation and the identifier corresponding to the data generated by performing the upsert operation, and store, in another cache space in the cache unit, a type of a deletion operation and an identifier corresponding to data on which the deletion operation is performed.

For example, the service execution unit stores the identifiers, the type of the operations, that is, (Xiao Ming, the type of the upsert operation) and (Xiao Zhang, the type of the upsert operation) in a cache space in the cache unit, and stores "Xiao Ming" and the type of the deletion operation in another cache space in the cache unit.

Step 402: The service execution unit pushes a notification message to a scheduling unit, to notify the scheduling unit that the data in the cloud database changes.

Step 403: The scheduling unit pushes a scheduling message to an information obtaining unit, to schedule the information obtaining unit to determine related information of the data.

For example, after receiving the notification message, the scheduling unit learns that the data in the cloud database changes, and then the scheduling unit may push the scheduling message to the information obtaining unit.

Step 404: After receiving the scheduling information, the information obtaining unit obtains the identifier and the type of the operation from the cache unit.

Step 405: The information obtaining unit determines the related information of the data based on the identifier of the data, the type of the operation, and whether the data exists in the cloud database currently.

The following describes step 405 in different cases.

Case 1: When the related information of the data is determined, the data (Xiao Ming, 12, male) and the data (Xiao Zhang, 9, male) are recorded in the cloud database.

It can be learned from descriptions in step 401 that the identifiers and the type of the operations that are stored in the cache unit include: (Xiao Ming, the type of the upsert operation) and (Xiao Zhang, the type of the upsert operation). Therefore, before the related information of the data is determined, the cloud database separately records the data corresponding to "Xiao Ming" and the data corresponding to "Xiao Zhang", and when the related information of the data is determined, the data (Xiao Ming, 12, male) and the data (Xiao Zhang, 9, male) are recorded in the cloud database. Therefore, the data (Xiao Ming, 12, male), the type of the upsert operation, the data (Xiao Zhang, 9, male), and the type of the upsert operation may be pushed to the client.

It can be learned from the descriptions in step 401 that the identifier and the type of the operation that are stored in the cache unit include: (Xiao Ming, the type of the deletion operation). Therefore, before the related information of the data is determined, the cloud database performs the deletion operation on the data corresponding to "Xiao Ming", but when the related information of the data is determined, the data (Xiao Ming, 12, male) is still recorded in the cloud database. Therefore, no data about "Xiao Ming" may be pushed to the client this time.

Case 2: When the related information of the data is determined, the data recorded in the cloud database includes the data (Xiao Ming, 14, male) and the data (Xiao Zhang, 9, male).

It can be learned from descriptions in step 401 that the identifiers and the type of the operations that are stored in the cache unit include: (Xiao Ming, the type of the upsert operation) and (Xiao Zhang, the type of the upsert operation). Therefore, before the related information of the data is determined, the cloud database separately records the data corresponding to "Xiao Ming" and the data corresponding to "Xiao Zhang", and when the related information of the data is determined, the data (Xiao Ming, 14, male) and the data (Xiao Zhang, 9, male) are recorded in the cloud database. Therefore, the data (Xiao Ming, 14, male), the type of the upsert operation, the data (Xiao Zhang, 9, male), and the type of the upsert operation may be pushed to the client.

It can be learned from the descriptions in step 401 that the identifier and the type of the operation that are stored in the cache unit include: (Xiao Ming, the type of the deletion operation). Therefore, before the related information of the data is determined, the cloud database performs the deletion operation on the data corresponding to "Xiao Ming", but when the related information of the data is determined, the data (Xiao Ming, 14, male) is still recorded in the cloud database. Therefore, no data about "Xiao Ming" may be pushed to the client this time.

Case 3: The data recorded in the cloud database includes the data (Xiao Zhang, 9, male).

It can be learned from descriptions in step 401 that the identifier and the type of the operation that are stored in the cache unit include: (Xiao Ming, the type of the upsert operation). Therefore, before the related information of the data is determined, the cloud database records the data corresponding to "Xiao Ming", but when the related information of the data is determined, there is no data corresponding to "Xiao Ming" in the cloud database. Therefore, no data about "Xiao Ming" may be pushed to the client this time.

It can be learned from the descriptions in step 401 that the identifier and the type of the operation that are stored in the cache unit include: (Xiao Ming, the type of the deletion operation). Therefore, before the related information of the data is determined, the cloud database performs the deletion operation on the data corresponding to "Xiao Ming", and when the related information of the data is determined, there is no data corresponding to "Xiao Ming" in the cloud database. Therefore, "Xiao Ming" and the type of the deletion operation may be pushed to the client this time.

It can be learned from the descriptions in step 401 that the identifier and the type of the operation that are stored in the cache unit include: (Xiao Zhang, the type of the upsert operation). Therefore, before the related information of the data is determined, the cloud database records the data corresponding to "Xiao Zhang", and when the related information of the data is determined, the data (Xiao Zhang, 9, male) is recorded in the cloud database. Therefore, the data (Xiao Zhang, 9, male) and the type of the upsert operation may be pushed to the client.

Step 406: The information obtaining unit pushes the related information of the data to a pushing unit.

Step 407: The pushing unit pushes the related information of the data to the client.

Figure 5:
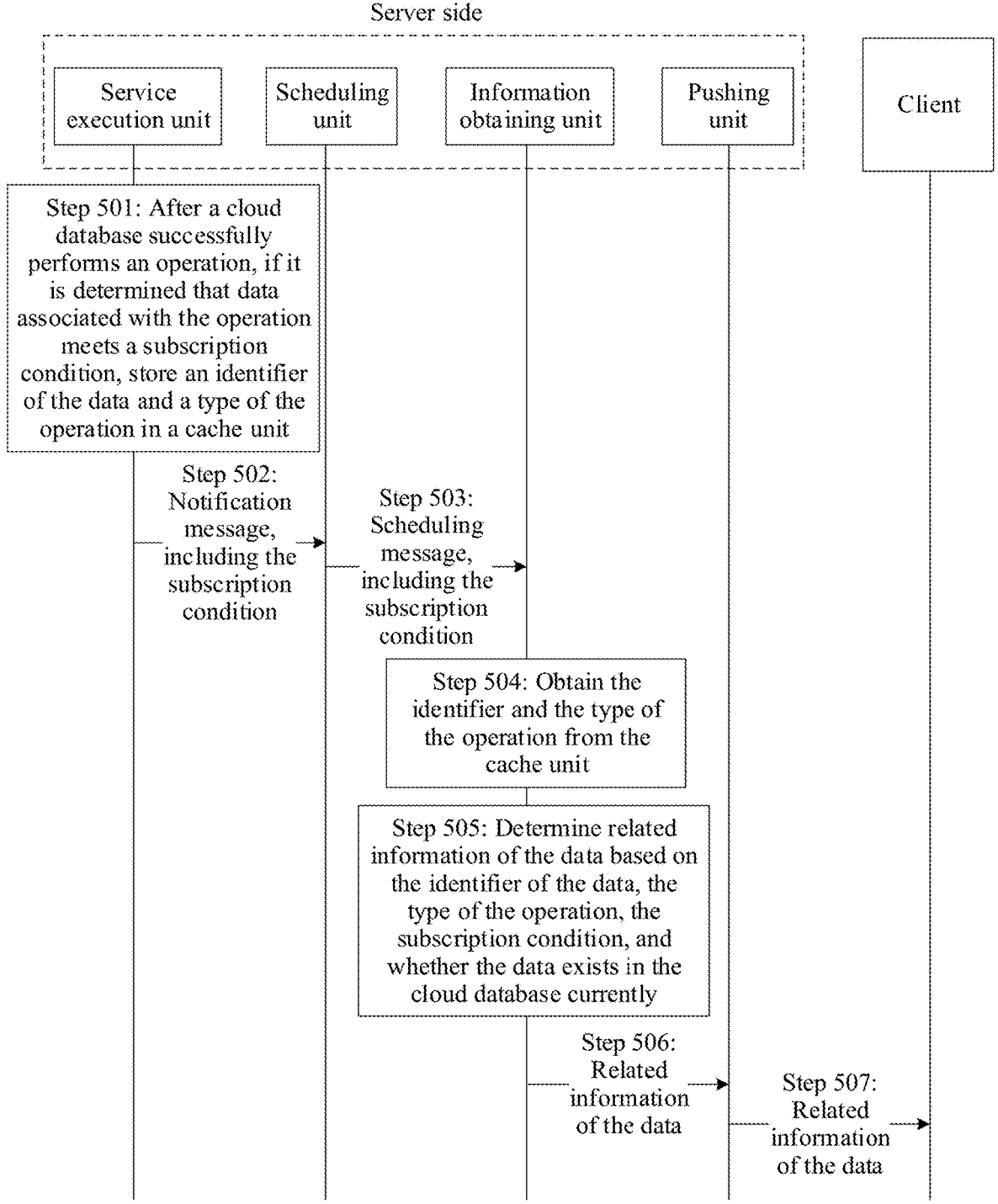
FIG. 5 is a flowchart of still another example of an information pushing method according to an embodiment of this disclosure.

The following continues to use a server side shown in FIG. 3 as an example to describe another pushing method 500 according to an embodiment of this disclosure. FIG. 5 is a schematic flowchart of the method 500. The method 500 includes at least the following steps.

Step 501: After a cloud database successfully performs an operation, if it is determined that data associated with the operation meets a subscription condition, a service execution unit stores an identifier of the data and a type of the operation in a cache unit.

For example, the cloud database stores names, classes, and genders of students, and the service execution unit receives four data operation requests from a client, where three data operation requests are respectively used to request the cloud database to record (Xiao Ming, 2, male), (Xiao Ming, 3, male), and (Xiao Zhang, 1, male), and one data operation request is used to request the cloud database to delete data related to "Xiao Ming". The service execution unit forwards the four data operation requests to the cloud database.

It is assumed that before the four data operation requests arrive at the cloud database, a piece of data (Xiao Ming, 1, male) already exists in the cloud database. Because the service execution unit forwards the requests to the cloud database in an asynchronous processing manner, after the cloud database processes the four requests, data recorded in the cloud database may be in the following three cases.

Case 1:

After the cloud database processes the four requests, the data recorded in the cloud database includes (Xiao Ming, 2, male) and (Xiao Zhang, 1, male).

Case 2:

After the cloud database processes the four requests, the data recorded in the cloud database includes (Xiao Ming, 3, male) and (Xiao Zhang, 1, male).

Case 3:

After the cloud database processes the four requests, the data recorded in the cloud database includes (Xiao Zhang, 1, male).

For case 1 to case 3, after the cloud database successfully performs each operation, the service execution unit may determine whether the data associated with the operation meets the subscription condition.

For example, each client may synchronize a subscription condition of the client to the server side in advance, and the server side may cache the subscription condition in the cache unit. After the cloud database successfully executes the request, the service execution unit may obtain the subscription condition from the cache unit, and determine the data (Xiao Ming, 2, male), the data (Xiao Ming, 3, male), the data (Xiao Zhang, 1, male) that are generated by performing upsert operations, and the data (Xiao Ming, 2, male), the data (Xiao Ming, 3, male), and data (Xiao Ming, 1, male) on which deletion operations are performed whether meet the subscription condition.

For example, if the subscription condition is data of a student in Class 2, the service execution unit may store, in the cache unit, a type of the upsert operation, an identifier "Xiao Ming" corresponding to the data (Xiao Ming, 2, male) generated by performing the upsert operation, a type of the deletion operation, and the identifier "Xiao Ming" corresponding to the data (Xiao Ming, 2, male) on which the deletion operation is performed.

When the type of the upsert operation, the identifier "Xiao Ming" corresponding to the data (Xiao Ming, 2, male) generated by performing the upsert operation, the type of the deletion operation, and the identifier "Xiao Ming" corresponding to the data (Xiao Ming, 2, male) on which the deletion operation is performed is stored in the cache unit, the service execution unit may store, in a cache space in the cache unit, the type of the upsert operation and the identifier "Xiao Ming" corresponding to the data (Xiao Ming, 2, male) generated by performing the upsert operation, and store, in another cache space in the cache unit, the type of the deletion operation and the identifier "Xiao Ming" corresponding to the data (Xiao Ming, 2, male) on which the deletion operation is performed. It should be noted that both the cache space for storing "Xiao Ming" and the type of the deletion operation and the cache space for storing "Xiao Ming" and the type of the upsert operation correspond to the subscription condition.

Step 502: The service execution unit pushes a notification message to a scheduling unit, to notify the scheduling unit that the data in the cloud database changes, where the notification message includes the subscription condition.

Step 503: The scheduling unit pushes a scheduling message to an information obtaining unit, to schedule the information obtaining unit to determine related information of the data, where the scheduling message includes the subscription condition.

For example, after receiving the notification message, the scheduling unit learns that the data in the cloud database changes, and then the scheduling unit may push the scheduling message to the information obtaining unit.

Step 504: After receiving the scheduling information, the information obtaining unit obtains the identifier and the type of the operation from the cache unit.

For example, the information obtaining unit obtains, based on the subscription condition, "Xiao Ming", the type of the upsert operation, "Xiao Ming", and the type of the deletion operation from the cache spaces corresponding to the subscription condition.

Step 505: The information obtaining unit determines the related information of the data based on the identifier of the data, the type of the operation, the subscription condition, and whether the data exists in the cloud database currently.

The following describes step 505 in different cases.

Case 1: When the related information of the data is determined, the data (Xiao Ming, 2, male) and the data (Xiao Zhang, 1, male) are recorded in the cloud database.

It can be learned from descriptions in step 501 that the identifier and the type of the operation that are stored in the cache unit include: (Xiao Ming, the type of the upsert operation). Therefore, before the related information of the data is determined, the cloud database records the data corresponding to "Xiao Ming", and when the related information of the data is determined, the data (Xiao Ming, 2, male) is recorded in the cloud database, and the data meets the subscription condition. Therefore, the data (Xiao Ming, 2, male) and the type of the upsert operation may be pushed to the client.

It can be learned from the descriptions in step 501 that the identifier and the type of the operation that are stored in the cache unit include: (Xiao Ming, the type of the deletion operation). Therefore, before the related information of the data is determined, the cloud database performs the deletion operation on the data corresponding to "Xiao Ming", but when the related information of the data is determined, the data (Xiao Ming, 2, male) is still recorded in the cloud database. Therefore, no data about "Xiao Ming" may be pushed to the client this time.

Case 2: When the related information of the data is determined, the data recorded in the cloud database includes the data (Xiao Ming, 3, male) and the data (Xiao Zhang, 1, male).

It can be learned from descriptions in step 501 that the identifier and the type of the operation that are stored in the cache unit include: (Xiao Ming, the type of the upsert operation). Therefore, before the related information of the data is determined, the cloud database records the data corresponding to "Xiao Ming", but when the related information of the data is determined, although the data (Xiao Ming, 3, male) is recorded in the cloud database, the data does not meet the subscription condition. Therefore, no data about "Xiao Ming" may be pushed to the client this time.

It can be learned from the descriptions in step 501 that the identifier and the type of the operation that are stored in the cache unit include: (Xiao Ming, the type of the deletion operation). Therefore, before the related information of the data is determined, the cloud database performs the deletion operation on the data corresponding to "Xiao Ming", but when the related information of the data is determined, although the data (Xiao Ming, 3, male) is recorded in the cloud database, the data does not meet the subscription condition. Therefore, "Xiao Ming", the type of the deletion operation, and the subscription condition may be pushed to the client this time.

Case 3: The data recorded in the cloud database includes the data (Xiao Zhang, 1, male).

It can be learned from descriptions in step 501 that the identifier and the type of the operation that are stored in the cache unit include: (Xiao Ming, the type of the upsert operation). Therefore, before the related information of the data is determined, the cloud database records the data corresponding to "Xiao Ming", but when the related information of the data is determined, there is no data corresponding to "Xiao Ming" in the cloud database. Therefore, no data about "Xiao Ming" may be pushed to the client this time.

It can be learned from the descriptions in step 501 that the identifier and the type of the operation that are stored in the cache unit include: (Xiao Ming, the type of the deletion operation). Therefore, before the related information of the data is determined, the cloud database performs the deletion operation on the data corresponding to "Xiao Ming", and when the related information of the data is determined, there is no data corresponding to "Xiao Ming" in the cloud database. Therefore, "Xiao Ming" and the type of the deletion operation may be pushed to the client this time.

Step 506: The information obtaining unit pushes the related information of the data to a pushing unit.

Step 507: The pushing unit pushes the related information of the data to the client.

For example, when pushing the related information of the data to the client, the pushing unit may find a client that has synchronized the subscription condition to the server side in advance, and push the related information of the data to the client that has synchronized the subscription condition to the server side in advance.

It should be noted that the information pushing method provided in embodiments of this disclosure may be applied to a scenario in which the client requests one piece of data in the cloud database by using one request, or may be applied to a scenario in which the client requests a plurality of pieces of data in the cloud database by using one request.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of embodiments of this disclosure.

The foregoing describes in detail the information pushing method provided in embodiments of this disclosure with reference to FIG. 1 to FIG. 5. The following describes in detail server side embodiments in this disclosure with reference to FIG. 6 and FIG. 7. It should be understood that descriptions of method embodiments correspond to descriptions of server side embodiments. Therefore, for a part that is not described in detail, refer to the method embodiments.

Figure 6:
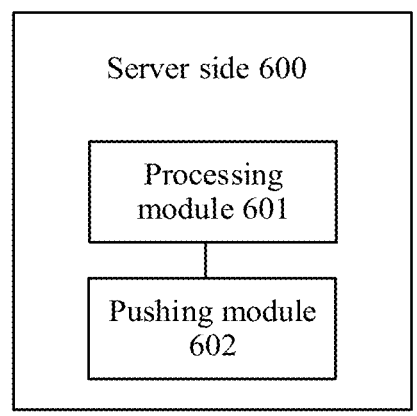
FIG. 6 is a block diagram of another example of a server side according to an embodiment of this disclosure.

FIG. 6 is a diagram of a structure of an example of a server side 600 according to an embodiment of this disclosure. The server side 600 includes a processing module 601 configured to, after a cloud database successfully performs an operation, store, in a target cache space, a type of the operation and an identifier of data associated with the operation, and a pushing module 602 configured to, when pushing to a client, push related information of the data to the client based on the identifier of the data, the type of the operation, and whether the data exists in the cloud database currently, where the related information of the data is used by the client to determine a change between the data in the cloud database currently and that before the operation is performed.

It should be understood that the server side 600 provided in this embodiment of this disclosure may be implemented by using an application-specific integrated circuit (ASIC) or a programmable logic device (PLD). The PLD may be a complex PLD (CPLD), a field-programmable gate array (FPGA), generic array logic (GAL), or any combination thereof. Alternatively, when the information pushing method shown in FIG. 2, FIG. 4, or FIG. 5 may be implemented by using software, modules of the server side 600 may also be software modules.

Optionally, in an implementation, the pushing module 602 is further configured to, if the type of the operation in the target cache space indicates that the data corresponding to the identifier is generated by performing an upsert operation, and the data exists in the cloud database currently, push the related information of the data to the client, where the related information of the data includes the data, or if the type of the operation in the target cache space indicates that a deletion operation is performed on the data corresponding to the identifier, and the data does not exist in the cloud database currently, push the related information of the data to the client, where the related information of the data includes the identifier corresponding to the data.

Optionally, in an implementation, if the type of the operation in the target cache space indicates that the data corresponding to the identifier is generated by performing the upsert operation, and the data exists in the cloud database currently, the related information of the data further includes a type of the upsert operation.

Optionally, in an implementation, if the type of the operation in the target cache space indicates that the deletion operation is performed on the data corresponding to the identifier, and the data does not exist in the cloud database currently, the related information of the data further includes a type of the deletion operation.

Optionally, in an implementation, the target cache space includes a first cache space and a second cache space, the first cache space is used to store the type of the upsert operation and the identifier corresponding to the data generated by performing the upsert operation, and the second cache space is used to store the type of the deletion operation and the identifier corresponding to the data on which the deletion operation is performed.

Optionally, in an implementation, the processing module 601 is further configured to, before the type of the operation and the identifier of the data associated with the operation are stored in the target cache space, determine whether the type of the operation and the identifier of the data associated with the operation already exist in the target cache space, and if the type of the operation and the identifier of the data associated with the operation already exist in the target cache space, store, in the target cache space in a deduplication manner, the type of the operation and the identifier of the data associated with the operation.

Optionally, in an implementation, the processing module 601 is further configured to obtain a subscription condition, where the subscription condition indicates data concerned by a client associated with the subscription condition, and after it is determined that the data meets the subscription condition, store the identifier of the data and the type of the operation in the target cache space.

Optionally, in an implementation, the processing module 601 is further configured to, before pushing the related information of the data to the client, determine that the subscription condition is associated with the client.

The server side 600 in embodiments of this disclosure may correspond to a corresponding body that performs the method described in embodiments of this disclosure, and the foregoing and other operations or functions of the units in the server side 600 are respectively used to implement corresponding procedures of the method in FIG. 2, FIG. 4, or FIG. 5. For brevity, details are not described herein again.

Figure 7:
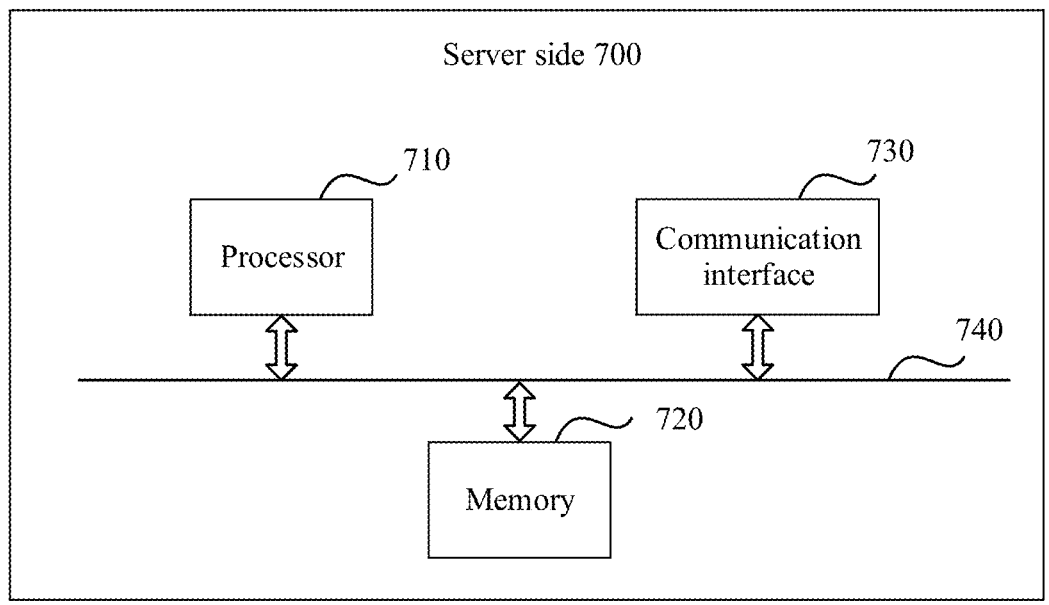
FIG. 7 is a block diagram of a structure of a server side according to an embodiment of this disclosure.

FIG. 7 is a diagram of a structure of a server side 700 according to an embodiment of this disclosure. The server side 700 includes a processor 710, a memory 720, a communication interface 730, and a bus 740.

It should be understood that the processor 710 in the server side 700 shown in FIG. 7 may correspond to the processing module 601 in the server side 600 in FIG. 6, and the communication interface 730 in the server side 700 may be configured to communicate with another device.

The processor 710 may be connected to the memory 720. The memory 720 may be configured to store program code and data. Therefore, the memory 720 may be a storage unit in the processor 710, an external storage unit independent of the processor 710, or a component including the storage unit in the processor 710 and the external storage unit independent of the processor 710.

Optionally, the server side 700 may further include the bus 740. The memory 720 and the communication interface 730 may be connected to the processor 710 through the bus 740. The bus 740 may be a Peripheral Component Interconnect (PCI) bus, an Extended Industry Standard Architecture (EISA) bus, or the like. The bus 740 may be classified into an address bus, a data bus, a control bus, and the like. For ease of representation, only one line is used for representation in FIG. 7, but this does not mean that there is only one bus or only one type of bus.

It should be understood that in this embodiment of this disclosure, the processor 710 may be a central processing unit (CPU). The processor may alternatively be a general-purpose processor, a digital signal processor (DSP), an ASIC, an FPGA or another programmable logic device, a discrete gate or transistor logic device, or a discrete hardware component. The general-purpose processor may be a microprocessor, or the processor may be another processor or the like. Alternatively, the processor 710 uses one or more integrated circuits, and is configured to execute a related program, to implement the technical solutions provided in embodiments of this disclosure.

The memory 720 may include a read-only memory (ROM) and a random-access memory (RAM), and provides instructions and data for the processor 710. A part of the processor 710 may further include a non-volatile RAM. For example, the processor 710 may further store device type information.

When the server side 700 runs, the processor 710 executes computer-executable instructions in the memory 720 to perform the operation steps of the methods.

It should be understood that the server side 700 in embodiments of this disclosure may correspond to a corresponding body that performs the method shown in FIG. 2, FIG. 4, or FIG. 5 in embodiments of this disclosure, and the foregoing and other operations or functions of the modules in the server side 700 are respectively used to implement corresponding procedures of the method in FIG. 2, FIG. 4, or FIG. 5. For brevity, details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, server side, and unit, refer to a corresponding process in the foregoing method embodiments, and details are not described herein again.

In the several embodiments provided in this disclosure, it should be understood that the disclosed system, server side, and method may be implemented in other manners. For example, the described server side embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the server side or the unit may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of software functional unit and sold or used as an independent product, the functions may be stored in a computer-readable storage medium. Based on such an understanding, the technical solutions may be implemented in a form of software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method implemented by a server side, wherein the method comprises:
    storing, in a target cache space after a first operation by a cloud database, a first type of the first operation and a first identifier of first data associated with the first operation;
    pushing, to a client based on the first identifier, the first type, and whether the first data exists in the cloud database, related information of the first data to enable the client to determine a data change in the cloud database from before the first operation to after the first operation;
    pushing, to the client, the related information when the first type indicates that the first data is generated by performing an update/insert operation and when the first data exists in the cloud database, wherein the related information comprises the first data; and
    pushing, to the client, the related information when the first type indicates that a deletion operation has been performed on the first data and when the first data does not exist in the cloud database, wherein the related information comprises the first identifier.

2. The method of claim 1, wherein the first type indicates that the first data is generated by performing the update/insert operation, wherein the first data exists in the cloud database, and wherein the related information further comprises a second type of the update/insert operation.

3. The method of claim 1, wherein the first type indicates that the deletion operation has been performed on the first data, wherein the first data does not exist in the cloud database, and wherein the related information further comprises a second type of the deletion operation.

4. The method of claim 1, wherein the method further comprises:
    storing in a first cache space of the target cache space a second type of an update/insert operation and a second identifier corresponding to second data generated by performing the update/insert operation; and
    storing in a second cache space of the target cache space a third type of a deletion operation and a third identifier corresponding to third data on which the deletion operation has been performed.

5. The method of claim 1, wherein before storing the first type and the first identifier, the method further comprises:
    further storing, in the target cache space in a deduplication manner, the first type and the first identifier when the first type and the first identifier already exist in the target cache space.

6. The method of claim 1, further comprising:
    obtaining a subscription condition of the client;
    identifying that the first data meets the subscription condition; and
    further storing, in response to identifying that the first data meets the subscription condition, the first identifier and the first type in the target cache space.

7. The method of claim 6, wherein before pushing the related information, the method further comprises identifying that the subscription condition is associated with the client.

8. The method of claim 1, wherein the method further comprises:
    clearing the first type of the first operation and the first identifier of first data associated with the first operation from the target cache space.

9. A server side comprising:
    a memory configured to store instructions; and
    a processor coupled to the memory and configured to execute the instructions to cause the server side to:
        store, in a target cache space after a first operation by a cloud database, a first type of the first operation and a first identifier of first data associated with the first operation;
        push, to a client based on the first identifier, the first type, and whether the first data exists in the cloud database, related information of the first data to enable the client to determine a data change in the cloud database from before the first operation to after the first operation;
        push, to the client, the related information when the first type indicates that the first data is generated by performing an update/insert operation and when the first data exists in the cloud database, wherein the related information comprises the first data; and
        push, to the client, the related information when the first type indicates that a deletion operation has been performed on the first data and when the first data does not exist in the cloud database, wherein the related information comprises the first identifier.

10. The server side of claim 9, wherein the first type indicates that the first data is generated by performing the update/insert operation, wherein the first data exists in the cloud database, and wherein the related information further comprises a second type of the update/insert operation.

11. The server side of claim 9, wherein the first type indicates that the deletion operation has been performed on the first data, wherein the first data does not exist in the cloud database, and wherein the related information further comprises a second type of the deletion operation.

12. The server side of claim 9, wherein the target cache space comprises a first cache space and a second cache space, and wherein the processor is further configured to execute the instructions to cause the server side to:
   store in the first cache space a second type of the update/insert operation and a second identifier corresponding to second data generated by performing the update/insert operation; and
   store in the second cache space a third type of the deletion operation and a third identifier corresponding to third data on which the deletion operation has been performed.

13. The server side of claim 9, wherein before storing the first type and the first identifier, the processor is further configured to execute the instructions to cause the server side to:
   further store, in the target cache space in a deduplication manner, the first type and the first identifier when the first type and the first identifier already exist in the target cache space.

14. The server side of claim 9, wherein the processor is further configured to execute the instructions to cause the server side to:
   obtain a subscription condition of the client;
   identify that the first data meets the subscription condition; and
   further store, in response to identifying that the first data meets the subscription condition, the first identifier and the first type in the target cache space.

15. The server side of claim 14, wherein before pushing the related information, the processor is further configured to execute the instructions to cause the server side to identify that the subscription condition is associated with the client.

16. The server side of claim 9, wherein the processor is further configured to execute instructions to cause the server side to:
   clear the first type of the first operation and the first identifier of first data associated with the first operation from the target cache space.

17. A computer program product comprising computer-executable instructions that are stored on a non-transitory computer storage medium and that, when executed by a processor, cause a server side to:
   store, in a target cache space after a first operation by a cloud database, a first type of the first operation and a first identifier of first data associated with the first operation;
   push, to a client based on the first identifier, the first type, and whether the first data exists in the cloud database, related information of the first data to enable the client to determine a data change in the cloud database from before the first operation to after the first operation;
   push, to the client, the related information when the first type indicates that the first data is generated by performing an update/insert operation and when the first data exists in the cloud database, wherein the related information comprises the first data; and
   push, to the client, the related information when the first type indicates that a deletion operation has been performed on the first data and when the first data does not exist in the cloud database, wherein the related information comprises the first identifier.

18. The computer program product of claim 17, wherein the first type indicates that the first data is generated by performing the update/insert operation, wherein the first data exists in the cloud database, and wherein the related information further comprises a second type of the update/insert operation.

19. The computer program product of claim 17, wherein the first type indicates that the deletion operation has been performed on the first data, wherein the first data does not exist in the cloud database, and wherein the related information further comprises a type of the deletion operation.

20. The computer program product of claim 17, wherein computer-executable instructions that are stored on the non-transitory computer storage medium and that, when executed by the processor, further cause the server side to:
   clear the first type of the first operation and the first identifier of first data associated with the first operation from the target cache space.

* * * * *